United States Patent Office 3,291,790
Patented Dec. 13, 1966

3,291,790
PROCESS FOR PREPARING DIBENZO-DIAZEPINONE COMPOUNDS
Richard E. Strube, Kalamazoo, Mich., assignor to The Upjohn Company, Kalamazoo, Mich., a corporation of Delaware
No Drawing. Filed Aug. 28, 1962, Ser. No. 220,052
5 Claims. (Cl. 260—239.3)

This invention pertains to a novel chemical process, and is more particularly directed to a novel method for preparing [5H]-dibenzo-[b,e][1,4]-diazepin-11(10H) - ones from novel alkyl N-(2-aminophenyl)anthranilates.

Previously, Clemo, Perkin, and Robinson (J. Chem. Soc. 1779, 1924) prepared [5H]-dibenzo-[b,e][1,4]-diazepin-11(10H)-one by thermally cyclizing N-(2-aminophenyl)anthranilic acid. Now, in accordance with the process of this invention, it has been found that better and more reproducible yields of [5H]-dibenzo-[b,e][1,4]-diazepin-11(10H)-one are achieved when the novel alkyl esters of N-(2-aminophenyl)anthranilic acid (Formula I, below) are thermally cyclized instead of N-(2-aminophenyl)anthranilic acid. The same applies to the preparation of [5H]-dibenzo - [b,e][1,4] - diazepin - 11 (10H)-ones having benzene ring substitution.

The novel process of the invention is operable with any of the novel alkyl N-(2-aminophenyl)anthranilates having the structural formula

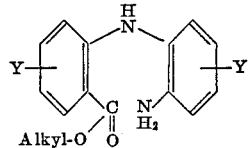

I wherein "Alkyl" is preferably lower-alkyl of from 1 to 4 carbon atoms, inclusive, for example, methyl, ethyl, propyl, butyl, and isomeric forms thereof; and Y is hydrogen or a noninterfering substituent, for example, halogen, alkyl, alkoxy, alkylmercapto, haloalkyl, phenyl, substituted phenyl, aralkyl, and the like.

The desired cyclization of an alkyl N-(2-aminophenyl)-anthranilate having the Formula I is conveniently effected by heating the ester either in the presence of an inert liquid medium or alone. The inert liquid medium can be a solvent for the anthranilate if desired, although this is not a necessary condition. Advantageously, the anthranilate is heated over a range of temperatures from about 115° C. to about 250° C. or even higher. Illustratively, an anthranilate can be heated at least to its melting point and maintained in molten condition at a desired temperature until cyclization is substantially complete. Further illustratively, an anthranilate can be heated in the presence of an inert liquid medium such as butanol, pentanol, xylene, tetralin, decalin, mineral oil, silicone oil, naphthalene, and the like at temperatures above about 115° C. until cyclization is substantially complete. The thus-produced [5H]-dibenzo - [b,e][1,4] - diazepin - 11 (10H)-one is recovered by conventional procedures, e.g., evaporation, solvent extraction, filtration, crystallization, etc. Likewise, cyclization of an alkyl N-(2-aminophenyl) anthranilate can be accomplished by heating in an autoclave at temperatures above about 115° C. in the presence of a relatively low-boiling inert liquid medium such as methanol, ethanol, and propanol. The [5H]-dibenzo-[b,e][1,4]-diazepin-11(10H)-one product is then recovered by evaporating the solvent.

Thermal cyclization of methyl N-(2-aminophenyl) anthranilate to produce [5H]-dibenzo-[b,e][1,4]-diazepin-11(10H)-one has been effected as follows: by refluxing a xylene solution; by refluxing a decalin solution; by refluxing a naphthalene solution; and by heating a silicone oil suspension at 160° to 165° C.

The novel process of the invention thus provides [5H]-dibenzo-[b,e][1,4]-diazepin - 11(10H) - ones having the structural formula

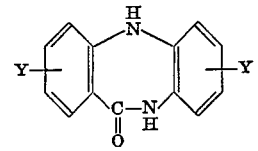

II wherein Y is as indicated above.

Representative non-interfering alkyl substituents include methyl, ethyl, propyl, butyl, amyl, hexyl, heptyl, octyl, dodecyl, and the like. Representative non-interfering alkoxy substituents include methoxy ethoxy, propoxy, butoxy, hexyloxy, octyloxy, and the like. Representative non-interfering alkylmercapto substituents include methylmercapto, ethylmercapto, propylmercapto, butylmercapto, hexylmercapto, octylmercapto, and the like. Representative non-interfering haloalkyl substituents include trifluoromethyl, 2-chloroethyl, 3-chloropropyl, 2,4-dichlorobutyl, and the like. Representative non-interfering substituted phenyl substituents include p-chlorophenyl, o-methoxyphenyl, m-tolyl, 3,5-dimethylphenyl, and the like. Representative non-interfering aralkyl substituents include benzyl, α-methylbenzyl, phenethyl, and the like. Halogen includes chlorine, bromine, iodine, and fluorine.

Compounds having Formula II, above, are useful for synthesizing pharmacologically active compounds. Illustratively, a [5H] - dibenzo - [b,e][1,4] - diazepin - 11 (10H)-one having the Formula II wherein Y is hydrogen, chlorine, fluorine, trifluoromethyl, lower-alkyl as defined above, and lower-alkoxy, for example, methoxy, ethoxy, propoxy, butoxy, and isomeric forms thereof, can be reacted in the form of an alkali metal salt, e.g., sodium salt and the like, with an aminoalkyl halide of the formula

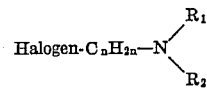

wherein "Halogen" is preferably chlorine; —$C_nH_{2n}$— is branched or straight chain alkylene having at least 2 carbon atoms between the valences, for example, ethylene, propylene, tetramethylene, butylene, dimethylethylene, and the like; $n$ is an integer from 2 to 4, inclusive; and $R_1$ and $R_2$ taken separately are selected from the group consisting of benzyl and lower-alkyl as defined above, and taken together with —N< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene wherein lower-alkyl is as defined above, to produce 10-aminoalkyl-[5H]-dibenzo-[b,e][1,4]-diazepin-11(10H)-ones having the structural formula

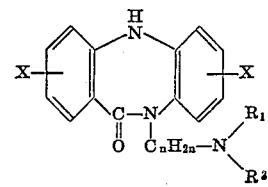

III wherein —$C_nH_{2n}$—, $n$, $R_1$, and $R_2$ are as defined above, and X is hydrogen, chlorine, fluorine, trifluoromethyl, lower-alkyl as defined above, and lower-alkoxy as defined above. When one or both of $R_1$ and $R_2$ are benzyl the corresponding N-monoalkyl or N-unsubstituted compounds are obtained by removing the benzyl group or groups from the nitrogen, preferably by catalytic hydrogenolysis. The compounds thus produced and the compounds of Formula III wherein $R_1$ and $R_2$ taken separately are alkyl and taken together with —N< constitute the saturated heterocyclic amino radical

as defined are pharmacologically active as phychic energizes, and they inhibit pseudocholinesterase.

The novel alkyl N-(2-aminophenyl)anthranilates having the Formula I above are basic nitrogenous compounds and can be used as described in U.S. Patents 1,915,334 and 2,075,359 for preparing amine fluosilicate mothproofing agents. Likewise, they can be used in accordance with U.S. Patents 2,425,320 and 2,606,155 to form amine thiocyanate-formaldehyde condensation products for use as pickling inhibitors. The novel alkyl N-(2-aminophenyl)anthranilates having the Formula I above, wherein Y is hydrogen, chlorine, fluorine, trifluoromethyl, lower-alkyl, and lower-alkoxy are active as anti-inflammatory agents and can be used in the treatment of rheumatism and arthritis.

The novel alkyl N-(2-aminophenyl)anthranilates of Formula I, above, are prepared by reducing the nitro group of an alkyl N-(2-nitrophenyl)anthranilate having the structural formula

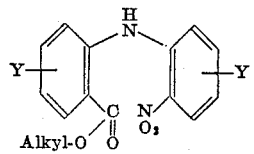    IV wherein Y and "Alkyl" are as indicated above.

Reduction of the nitro group of the alkyl N-(2-nitrophenyl)anthranilate to amino is conveniently accomplished by any of the well-known methods for reducing nitro groups to amino groups. Illustratively, the alkyl N-(2-nitrophenyl)anthranilate can be readily reduced with hydrogen at about 50 lbs. pressure in the presence of a catalyst and an inert organic solvent such as an alcohol, for example, methanol, ethanol, propanol, and the like. Thus, catalytic hydrogenation can be employed in the presence of a noble metal catalyst, such as palladium (advantageously supported on charcoal, calcium carbonate, or other conventional supports), platinum, and the like; or a base metal catalyst such as Raney nickel, Raney cobalt, and the like; and in the presence of an inert solvent such as dioxane, methyl alcohol, ethyl alcohol, isopropyl alcohol, and the like. Pressures ranging from about atmospheric pressure to about 50 lbs. per square inch and temperature conditions ranging from about 10° C. to about 50° C. can be employed in conducting the hydrogenation; 40 lbs. pressure and reaction temperatures of from about 20° C. to about 30° C. ordinarily being preferred. Alternatively, chemical reducing agents can be employed, e.g., ammonium sulfide, ferrous sulphate in alkaline solution, Clemo et al., supra, or stannous chloride, McCombie et al., J. Chem. Soc. 1928, p. 358; or electrolytic reduction can be employed, e.g., in the presence of a mixture of dioxane and dilute hydrochloric acid. Other suitable methods are described in Kirk and Othmer, Encyclopedia of Chemical Technology, vol. 1, pages 673 to 691. Catalytic hydrogenation is preferred.

The alkyl N-(2-nitrophenyl)anthranilates of Formula IV, above, are prepared by esterifying an N-(2-nitrophenyl)anthranilic acid having the structural formula

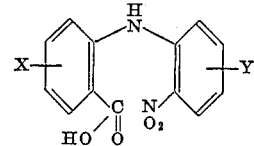   V wherein Y is as indicated above. Esterification is accomplished according to conventional procedures such as heating the acid with an alkanol, for example, methanol, ethanol, propanol, and butanol in the presence of a strong acid such as hydrochloric acid. The ester is recovered and purified by conventional procedures such as filtration, distillation, precipitation, washing, and drying.

The N-(2-nitrophenyl)anthranilic acids of Formula V, above, are obtained by reacting an anthranilic acid with a 1-halo-2-nitrobenzene. The reaction of the anthranilic acid and the 1-halo-2-nitrobenzene can be carried out as described by Goldberg, Ber. 39, 1691 (1906). Advantageously, the appropriate ring-unsubstituted or ring-substituted 1-halo-2-nitrobenzene and anthranilic acid are reacted in the presence of n-amyl alcohol, a catalytic amount of powdered copper, and a base, e.g., potassium carbonate (preferred), calcium carbonate, and the like. The proportion of reactants is not critical, and stoichiometric proportions can be used. It is preferred, however, that an excess of the 1-halo-2-nitrobenzene be used. The reaction is exothermic and proceeds at temperatures in the range of about 75° C. to about 250° C. The N-(2-nitrophenyl)anthranilic acid is recovered by conventional methods, illustratively, by removing excess 1-halo-2-nitrobenzene by steam distillation, and isolating the compound by acidification. The compound is purified by crystallization from a suitable solvent.

Appropriate ring-substituted anthranilic acids and 1-halo-2-nitrobenzenes are known or can be prepared according to known methods. Representative known anthanilic acids include 3-chloroanthranilic acid, 4-chloro-, 5-chloro-, 6-chloro-, 4-fluoro-, 5-fluoro-, 6-fluoro-, 4-ethoxy-, 3-methoxy-, 4-methoxy-, 5-methoxy-, 3-methyl-, 4-methyl-, 5-methyl-, 6-methyl-, 4-tert-butyl-, 3,4-dichloro-, 3,5-dichloro-, 3,6-dichloro-, 4,5-dichloro-, 4,6-dichloro-, 3,4-dimethoxy-, 3,5-dimethoxy-, 5,6-dimethoxy-, 3,4-dimethyl-, 3,5-dimethyl-, 3,6-dimethyl-, 4,5-dimethyl-, 4,6-dimethyl-, 5,6-dimethyl-, 3-methoxy-4-methyl-, 4-ethoxy-3-methylanthranilic acids, and the like.

Representative known 1-halo-2-nitrobenzenes include 1 - bromo-3-chloro-2-nitrobenzene, 1-bromo-4-chloro-2-nitrobenzene, 1-bromo-4-fluoro-2-nitrobenzene, 1-bromo-4,5 - difluoro-2-nitrobenzene, 1-bromo-3-ethyl-2-nitrobenzene, 1 - bromo-4-ethyl-2-nitrobenzene, 1-bromo-4-tert-butyl - 2 - nitrobenzene, 1-bromo-4-methoxy-2-nitrobenzene, 1-bromo-4,5-di-n-butoxy-2-nitrobenzene, 1-bromo-4,5,6-trimethoxy-2-nitrobenezene, and the like.

The following examples are illustrative of the process and products of the present invention, but are not to be construed as limiting.

PREPARATION I

*N-(2-nitrophenyl)anthranilic acid*

A mixture of 600 g. (3.0 moles) of 1-bromo-2-nitrobenzen, 300 g. (2.2 moles) of anthranilic acid, and 300 ml. of n-amyl alcohol was heated in an oil bath in a 2-l. three-neck, round-bottom flask, provided with a mechanical stirrer, a reflux condenser, and a thermometer. After most of the chemicals had dissolved and the mixture had reached a temperature of about 80° to 90° C. stirring was begun and continued while 3.0 g. of powdered copper and 300 g. (2.2 moles) of potassium carbonate were added. The reaction mixture became red, and within about 15 minutes the temperature rose from about 80° to about 120° C. A solid formed which prevented further stirring. The reflux condenser was replaced by a distilling condenser and the water and solvent were distilled. The temperature of the oil bath was increased gradually to 200° to 210° C. and maintained at this temperature for three hours. The oil bath was replaced by a steam bath, 500 ml. of water was poured into the flask, and the excess of 1-bromo-2-nitrobenzene was removed by steam distillation. When distillation of 1-bromo-2-nitrobenzene was substantially completed, the mixture was filtered through a sintered glass funnel, and water was added to a total volume of 5 liters (the solution was red). After cooling to about 25° C. overnight and filtering, aqueous hydrochloric acid (1:1) was carefully added to the solution until it was just acid to Congo red. An ochre colored precipitate that formed was collected on a filter, washed with 1500 ml. of water, and dried under reduced pressure at 70° C. There was thus obtained 521 g. (92% yield, based on anthranilic acid) of N-(2-nitrophenyl)anthranilic acid having a melting point of 206° to 214° C. A sample of this preparation after recrystallization from acetic acid or xylene had a melting point of 219° C. The material melting at 206° to 214° C. was used without further purification in Preparation VI.

PREPARATION II

Following the procedure of Preparation I but substituting 5-chloroanthranilic acid, 4-chloro-, 3-methyl-, 4-tert-butyl-, 6-fluoro-, 4,5-dimethyl-, 3-methoxy-4-methyl-, and 4-ethoxyanthranilic acids for anthranilic acid, there are prepared N-(2-nitrophenyl)-5-chloro-, N-(2-nitrophenyl)-4-chloro- (M.P. 281–283° C.), N-(2-nitrophenyl)-3-methyl-, N-(2-nitrophenyl)-4-tert-butyl-, N-(2-nitrophenyl)-6-fluoro-, N-(2-nitrophenyl)-4,5-dimethyl-, N-(2-nitrophenyl)-3-methoxy-4-methyl-, and N-(2-nitrophenyl)-4-ethoxyanthranilic acids, respectively.

PREPARATION III

Following the procedure of Preparation I but substituting 1-bromo-2-nitro-4-tert-butylbenzene, 1-bromo-3-ethyl-2-nitro-benzene, 1-bromo-4,5-difluoro-2-nitrobenzene, 1-bromo-4,5-di-n-butoxy-2-nitrobenzene, 1-bromo-2-nitro-4,5,6-trimethoxybenzene, and 1-bromo-2-nitro-5-trifluoromethylbenzene for 1-bromo-2-nitrobenzene, there are prepared N-(2-nitro-4-tert-butylphenol)-, N-(3-ethyl-2-nitrophenyl)-, N-(4,5-difluoro-2-nitrophenyl)-, N-(2-nitro-4,5,6-trimethoxyphenyl)-, and N-(2-nitro-5-trifluoromethylphenyl)-anthranilic acids, respectively.

PREPARATION IV

Following the procedure of Preparation I but substituting 5-chloroanthranilic acid for the anthranilic acid and 1-bromo-4-chloro-2-nitrobenzene for the 1-bromo-2-nitrobenzene, there is prepared N-(4-chloro-2-nitrophenyl)-5-chloroanthranilic acid.

PREPARATION V

Following the procedure of Preparation I but substituting 5-methoxyanthranilic acid for the anthranilic acid and 1-bromo-4-methoxy-2-nitrobenzene for the 1-bromo-2-nitrobenzene, there is prepared N-(4-methoxy-2-nitrophenyl)-5-methoxyanthranilic acid.

PREPARATION VI

Methyl N-(2-nitrophenyl)anthranilic acid

A suspension of 348 g. (1.35 moles) of N-(2-nitrophenyl)-anthranilic acid in 10 l. of commercial absolute methanol was heated on a steambath in a 12-l., three-neck, round-bottom, flask, provided with a mechanical stirrer, a reflux condenser and a gas inlet tube, until the acid was dissolved. Hydrogen chloride was then bubbled through the solution for 7 hours, and after about 3 hours a solid precipitated. After cooling the mixture overnight to about 25° C., the solid was recovered on a sintered glass funnel. The solid in the funnel was pressed to remove most of the solvent, and washed twice with 250-ml. portions of methanol. The orange colored compound thus obtained was dried under reduced pressure over sodium hydroxide. There was thus obtained 317 g. (86% yield) of methyl N-(2-nitrophenyl)anthranilate having a melting point of 155° to 157° C. After one recrystallization from methanol it melted at 156° to 157° C.

*Analysis.*—Calc'd for $C_{14}H_{12}N_2O_4$: C, 61.76; H, 4.44; N, 10.29. Found: C, 61.90; H, 4.79; N, 10.46.

Following the same procedure but substituting

N-(2-nitrophenyl)-3-methylanthranilic acid,
N-(2-nitrophenyl)-4-chloro-,
N-(2-nitrophenyl)-4-tert-butyl-,
N-(4,5-difluoro-2-nitrophenyl)-,
N-(2-nitro-4-tert-butylphenyl)-,
N-(2-nitro-4,5,6-trimethoxyphenyl)-,
N-(2-nitro-5-trifluoromethylphenyl)-,
N-(3-ethyl-2-nitrophenyl)-,
N-(2-nitrophenyl)-5-chloro-,
N-(2-nitrophenyl)-6-fluoro-,
N-(2-nitrophenyl)-4,5-dimethyl-,
N-(2-nitrophenyl)-3-methoxy-4-methyl-,
N-(2-nitrophenyl)-4-ethoxy-,
N-(4-chloro-2-nitrophenyl)-5-chloro-,
N-(4-methoxy-2-nitrophenyl)-5-methoxy-, and
N-(4,5-di-n-butoxy-2-nitrophenyl)anthranilic acid, there are prepared methyl N-(2-nitrophenyl)-3-methylanthranilate, methyl N-(2-nitrophenyl)-4-chloro- (M.P. 174°–175° C.),
methyl N-(2-nitrophenyl)-4-tert-butyl-,
methyl N-(4,5-difluoro-2-nitrophenyl)-,
methyl N-(2-nitro-4-tert-butylphenyl)-,
methyl N-(2-nitro-4,5,6-trimethoxyphenyl)-,
methyl N-(2-nitro-5-trifluoromethylphenyl)-,
methyl N-(3-ethyl-2-nitrophenyl)-,
methyl N-(2-nitrophenyl)-5-chloro-,
methyl N-(2-nitrophenyl)-6-fluoro-,
methyl N-(2-nitrophenyl)-4,5-dimethyl-,
methyl N-(2-nitrophenyl)-3-methoxy-4-methyl-,
methyl N-(2-nitrophenyl)-4-ethoxy-,
methyl N-(4-chloro-2-nitrophenyl)-5-chloro-,
methyl N-(4-methoxy-2-nitrophenyl)-5-methoxy-, and
methyl N-(4,5-di-n-butoxy-2-nitrophenyl)anthranilates, respectively.

Following the same procedure but substituting ethanol, propanol, and butanol for methanol, there are prepared the corresponding ethyl, propyl, and butyl N-(2-nitrophenyl)anthranilates.

EXAMPLE 1

*Preparation of methyl N-(2-aminophenyl)anthranilate*

A solution of 299.2 g. (1.1 moles) of methyl N-(2-nitrophenyl)anthranilate in 8 l. of commercial absolute methanol was transferred to an autoclave equipped with a mechanical stirrer. About 100 ml. of Raney nickel, previously washed with methanol, was added and hydrogen was introduced at a pressure of 50 p.s.i. The temperature was maintained at 25° C. and within 24 hours 98% of the theoretical amount of hydrogen had been absorbed. The solution was filtered. The catalyst on the filter was transferred to a 1-liter beaker, and it was washed thoroughly with two 500-ml. portions of warm methanol. The filtrate and wash solutions were combined and concentrated to a volume of about 6 l., and 3 l. of hot water was added. The aqueous solution was cooled in an ice bath and stirred for 3 to 4 hours. After filtering, and drying under reduced pressure at about 25° C., there was obtained 226 g. (85% yield) of methyl N-(2-aminophenyl)anthranilate having a melting point of 101° to 102° C. Recrystallization from dilute ethanol gave a colorless product melting at 102° to 103° C.

*Analysis.*—Calc'd for $C_{14}H_{14}N_2O_2$: C, 69.40; H, 5.81; N, 11.56. Found: C, 69.10; H, 5.60; N, 11.50.

Following the same procedure as described above but substituting methyl N-(2-nitrophenyl)-3-methylanthranilate,
methyl N-(2-nitrophenyl)-4-chloro-,
methyl N-(2-nitrophenyl)-4-tert-butyl-,
methyl N-(4,5-difluoro-2-nitrophenyl)-,
methyl N-(2-nitro-4-tert-butylphenyl)-,
methyl N-(2-nitro-4,5,6-trimethoxyphenyl)-,
methyl N-(2-nitro-5-trifluoromethylphenyl)-,
methyl N-(3-ethyl-2-nitrophenyl)-,
methyl N-(2-nitrophenyl)-5-chloro-,
methyl N-(2-nitrophenyl)-6-fluoro-,
methyl N-(2-nitrophenyl)-4,5-dimethyl-,
methyl N-(2-nitrophenyl)-3-methoxy-4-methyl-,
methyl N-(2-nitrophenyl)-4-ethoxy-,
methyl N-(4-chloro-2-nitrophenyl)-5-chloro-,
methyl N-(4-methoxy-2-nitrophenyl)-5-methoxy-, and
methyl N-(4,5-di-n-butoxy-2-nitrophenyl)anthranilates for methyl N-(2-nitrophenyl)anthranilate, there are prepared
methyl N-(2-aminophenyl)-3-methylanthranilate,
methyl N-(2-aminophenyl)-4-chloro- (M.P. 123.5–125° C.); calc'd for $C_{14}H_{13}ClN_2O_2$; C, 60.76; H, 4.74; N, 10.12; found: C, 61.05; H, 4.26; N, 9.99),
methyl N-(2-aminophenyl)-4-tert-butyl-,
methyl N-(2-amino-4,5-difluorophenyl)-,
methyl N-(2-amino-4-tert-butylphenyl)-,
methyl N-(2-amino-4,5,6-trimethoxyphenyl)-,
methyl N-(2-amino-5-trifluoromethylphenyl)-,
methyl N-(2-amino-3-ethylphenyl)-,
methyl N-(2-aminophenyl)-5-chloro-,
methyl N-(2-aminophenyl)-6-fluoro-,
methyl N-(2-aminophenyl)-4,5-dimethyl-,
methyl N-(2-aminophenyl)-3-methoxy-4-methyl-,
methyl N-(2-aminophenyl)-4-ethoxy-,
methyl N-(2-amino-4-chlorophenyl)-5-chloro-,
methyl N-(2-amino-4-methoxyphenyl)-5-methoxy-, and
methyl N-(2-amino-4,5-di-n-butoxyphenyl)anthranilates, respectively.

Following the same procedure but substituting the ethyl, propyl, and butyl N-(2-nitrophenyl)anthranilates disclosed in Preparation VI for the above methyl N-(2-nitrophenyl)-anthranilates, there are prepared the corresponding ethyl, propyl, and butyl N-(2-aminophenyl)anthranilates.

EXAMPLE 2

Preparation of [5H]-dibenzo-[b,e][1,4]-diazepin-11(10H)-one

A quantity (169.4 g., 0.70 mole) of methyl N-(2-aminophenyl)anthranilate was placed in a 500 ml., three-neck, round-bottom flask provided with a mechanical stirrer, a short distillation condenser, and a thermometer. The flask was heated in an oil bath in order to melt the contents. When the temperature of the melt reached 180° to 200° C., bubbles began to rise. When the temperature of the oil bath reached 240° to 250° C. it was kept at that temperature range for 1 hr. During this interval, 26 ml. of liquid distilled and the dark mixture became a semisolid mass. After cooling to room temperature, 100 ml. of ethanol (95%) was added and the mass was reduced with a spatula. The mixture of ethanol and crude product was transferred to a 1-liter Erlenmeyer flask, additional ethanol (300 ml.) was added, and the mixture was heated on the steam bath for 15 minutes with occasional swirling. After cooling to room temperature, the crude product was isolated by filtration and transferred to a porcelain dish. It was triturated several times with ether (total amount 1 liter) until no dark particles were present. The greenish-yellow [5H]-dibenzo-[b,e][1,4]-diazepin-11(10H)-one having a melting point of 253° to 254° C. was dried under reduced pressure at 100° C. to give 126 g. (86% yield) of product. Recrystallization of a small sample from pyridine gave bright yellow crystals melting at 254° to 255° C.

Analysis.—Calc'd for $C_{13}H_{10}N_2O$: C, 74.27; H, 4.79; N, 13.33. Found: C, 74.25; H, 4.91; N, 13.71.

Following the same procedure as described above but substituting methyl N-(2-aminophenyl)-3-methylanthranilate,
methyl N-(2-aminophenyl)-4-chloro-,
methyl N-(2-aminophenyl-4-tert-butyl,
methyl N-(2-amino-4,5-difluorophenyl)-,
methyl N-(2-amino-4-tert-butylphenyl)-,
methyl N-(2-amino-4,5,6-trimethoxyphenyl)-,
methyl N-(2-amino-5-trifluoromethylphenyl)-,
methyl N-(2-amino-3-ethylphenyl)-,
methyl N-(2-aminophenyl)-5-chloro-,
methyl N-(2-aminophenyl)-6-fluoro,
methyl N-(2-aminophenyl)-4,5-dimethyl-,
methyl N-(2-aminophenyl)-3-methoxy-4-methyl-,
methyl N-(2-aminophenyl)-4-ethoxy-,
methyl N-(2-amino-4-chlorophenyl)-5-chloro-,
methyl N-(2-amino-4-methoxyphenyl)-5-methoxy-,
methyl N-(2-amino-4,5-di-n-butoxyphenyl)anthranilates for methyl N-(2-aminophenyl)anthranilate, there are prepared 4-methyl-[5H]-dibenzo-[b,e][1,4]-diazepin-11(10H)-one, 3-chloro-, 3-tert-butyl-, 7,8-difluoro-, 8-tert-butyl-, 6,7,8-trimethoxy-, 7-trifluoromethyl-, 9-ethyl-, 2-chloro-, 1-fluoro-, 2,3-dimethyl-, 4-methoxy-3-methyl-, 3-ethoxy-, 2,8-dichloro-, 2,8-dimethoxy-, and 7,8-di-n-butoxy-[5H]-dibenzo-[b,e][1,4]-diazepin-11(10H)-ones, respectively.

Following the same procedure, the same [5H]-dibenzo-[b,e][1,4] - diazepin - 11(10H)-ones are obtained by thermally cyclizing the ethyl, propyl, and butyl N-(2-aminophenyl)anthranilates of Example 1 instead of the methyl N-(2-aminophenyl)anthranilates.

I claim:
1. The process for preparing [5H]-dibenzo-[b,e][1,4]-diazepin-11(10H)-ones having the formula

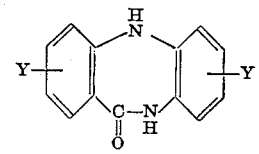

wherein Y is selected from the group consisting of hydrogen and a non-interfering substituent which comprises thermally cyclizing lower-alkyl N-(2-aminophenyl)anthranilates having the formula

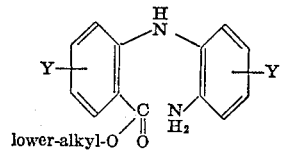

wherein Y is as indicated above and lower-alkyl is of from 1 to 4 carbon atoms, inclusive.

2. The process according to claim 1 wherein the lower-alkyl N-(2-aminophenyl)anthranilate is thermally cyclized at a temperature in the range of about 115° C. to about 250° C.

3. The process according to claim 2 wherein lower-alkyl is methyl.

4. The process which comprises reducing lower-alkyl N-(2-nitrophenyl)anthranilates having the formula

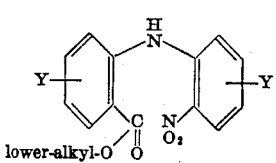

wherein Y is selected from the group consisting of hydrogen and a non-interfering susbtituent to produce lower-alkyl N-(2-aminophenyl)anthranilates having the formula

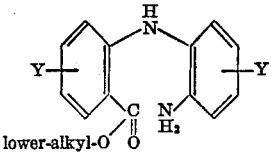

wherein Y is an indicated above, and thermally cyclizing the thus-prepared lower-alkyl N - (2 - aminophenyl)anthranilates to produce [5H]-dibenzo-[b,e][1,4]-diazepin-11(10H)-ones having the formula

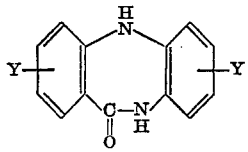

wherein Y is as indicated above.

5. The process for preparing [5H]-dibenzo-[b,e][1,4]-diazepin-11(10H)-ones having the formula

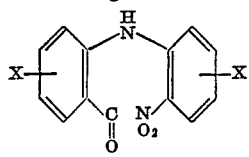

wherein X is selected from the group consisting of hydrogen, chlorine, fluorine, trifluoromethyl, lower-alkyl, and lower-alkoxy, which comprises catalytically reducing lower-alkyl N-(2-nitrophenyl)anthranilates having the formula

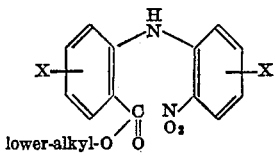

wherein X is as defined above, to produce lower-alkyl N-(2-aminophenyl)anthranilates having the formula

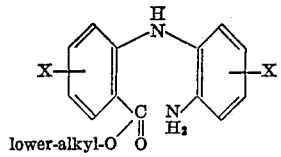

wherein X is as defined above, and thermally cyclizing the thus-produced lower-alkyl N - (2 - aminophenyl)anthranilates to produce the corresponding [5H]-dibenzo-[b,e][1,4]-diazepin-11(10H)-ones.

References Cited by the Examiner

UNITED STATES PATENTS

| | | |
|---|---|---|
| 2,852,510 | 9/1958 | Hoffmann et al. ____ 260—239.3 |
| 3,029,251 | 4/1962 | Fancher et al. _____ 260—239 |
| 3,046,300 | 7/1962 | Sletzinger et al. _____ 260—471 |
| 3,054,822 | 9/1962 | Schorr et al. _____ 260—471 |
| 3,084,155 | 4/1963 | Winthrop et al. ____ 260—239.3 |
| 3,150,125 | 9/1964 | Schmutz et al. _____ 260—239.3 |

OTHER REFERENCES

Burger: Medicinal Chemistry (New York, 1960), page 77.

Ried et al.: Ber. Deut. Chem., vol. 90, pages 2683–2687 (1957).

Wagner et al.: Synthetic Organic Chemistry (New York, 1953), pages 654–657.

ALEX MAZEL, *Primary Examiner.*

HENRY R. JILES, NICHOLAS S. RIZZO, *Examiners.*

J. T. MILLER, ALTON L. ROLLINS,
*Assistant Examiners.*